United States Patent
Kariya (10) Patent No.: US 9,379,986 B2
(45) Date of Patent: Jun. 28, 2016

(54) NETWORK RELAY DEVICE

(71) Applicant: Hitachi Metals, Ltd., Minato-ku, Tokyo (JP)

(72) Inventor: Kazutoshi Kariya, Tsuchiura (JP)

(73) Assignee: Hitachi Metals, Ltd., Tokyo (JP)

(*) Notice: Subject to any disclaimer, the term of this patent is extended or adjusted under 35 U.S.C. 154(b) by 122 days.

(21) Appl. No.: 14/246,258

(22) Filed: Apr. 7, 2014

(65) Prior Publication Data

US 2014/0321264 A1 Oct. 30, 2014

(30) Foreign Application Priority Data

Apr. 30, 2013 (JP) .................................. 2013-095392

(51) Int. Cl.
| | |
|---|---|
| *H04L 1/00* | (2006.01) |
| *H04L 12/801* | (2013.01) |
| *H04L 12/24* | (2006.01) |
| *H04L 12/26* | (2006.01) |

(52) U.S. Cl.
CPC ............ *H04L 47/16* (2013.01); *H04L 41/0659* (2013.01); *H04L 41/0668* (2013.01); *H04L 47/15* (2013.01); *H04L 43/0811* (2013.01)

(58) Field of Classification Search
CPC ....................................................... H04L 47/16
USPC .......................................................... 370/218
See application file for complete search history.

(56) References Cited

U.S. PATENT DOCUMENTS

2012/0250684 A1  10/2012  Ogura

FOREIGN PATENT DOCUMENTS

| JP | 2011-91477 A | 5/2011 |
| JP | 2012-130084 A | 7/2012 |
| JP | 2012-209855 A | 10/2012 |

*Primary Examiner* — Shripal Khajuria
(74) *Attorney, Agent, or Firm* — Crowell & Moring LLP (57) ABSTRACT

When a first line card receives a frame at a port, the line card refers to monitoring results by internal communicability monitoring units of other second to fourth line cards and a monitoring result by an internal communicability monitoring unit of its own, determines a first of a transmission destination from band limiting units of other line cards based on the monitoring results, and transmits the frame. The second line card limits the communication band of the frame by the first band limiting unit of its own, and transmits the frame to a predetermined port. If any fault is detected in the communicability in the internal communicability monitoring table to/from the second line card as the communication counterpart, and, if the communicability to/from the third line card as the communication counterpart is normal, the first line card changes the transmission destination into the second band limiting unit.

4 Claims, 8 Drawing Sheets

|  | LC1 | LC2 | LC3 | LC4 |
|---|---|---|---|---|
| ICCM INFORMATION OF LC1 | ○ | ○ | ○ | ○ |

FIG. 3C

ICCMTBL

| | TRANSMISSION SOURCE | LC1 | LC2 | LC3 | LC4 | |
|---|---|---|---|---|---|---|
| ICCM INFORMATION OF EACH LC WHICH HAS BEEN RECEIVED AT LC1 | LC1 | ○ | ○ | ○ | ○ | } IM1 |
| | LC2 | ○ | ○ | ○ | ×(LOC) | } IM2 |
| | LC3 | ○ | ○ | ○ | ○ | } IM3 |
| | LC4 | ○ | ○(RDI) | ○ | ○ | } IM4 |

FIG. 4A

ICCMTBL

| | TRANSMISSION SOURCE | LC1 | LC2 | LC3 | LC4 | |
|---|---|---|---|---|---|---|
| ICCM INFORMATION OF EACH LC WHICH HAS BEEN RECEIVED AT LC1 | LC1 | ○ | ○ | ○ | ○ | |
| | LC2 | ○ | ○ | ○ | ×(LOC) | ⇒ NG |
| | LC3 | ○ | ○ | ○ | ○ | OR |
| | LC4 | ○ | ○(RDI) | ○ | ○ | |

ICCMTBL

| | TRANSMISSION SOURCE | LC1 | LC2 | LC3 | LC4 | |
|---|---|---|---|---|---|---|
| ICCM INFORMATION OF EACH LC WHICH HAS BEEN RECEIVED AT LC1 | LC1 | ○ | ○ | ○ | ○ | |
| | LC2 | ○ | ○ | ○ | ×(LOC) | |
| | LC3 | ○ | ○ | ○ | ○ | ⇒ OK |
| | LC4 | ○ | ○(RDI) | ○ | ○ | OR |

|  | LC1 | LC2 | LC3 | LC4 |
|---|---|---|---|---|
| ICCM INFORMATION OF LC1 | ○ | ○ | ○ | ×(LOC) |

FIG. 7C

ICCMTBL

| | TRANSMISSION SOURCE | LC1 | LC2 | LC3 | LC4 | |
|---|---|---|---|---|---|---|
| ICCM INFORMATION OF EACH LC WHICH HAS BEEN RECEIVED AT LC1 | LC1 | ○ | ○ | ○ | ×(LOC) | }IM1 |
| | LC2 | ○ | ○ | ○ | ○(RDI) | }IM2 |
| | LC3 | ○ | ○ | ○ | ○ | }IM3 |
| | LC4 | × | ×(LOC) | × | × | }IM4 |

FIG. 8

ICCMTBL

| | TRANSMISSION SOURCE | LC1 | LC2 | LC3 | LC4 |
|---|---|---|---|---|---|
| ICCM INFORMATION OF EACH LC WHICH HAS BEEN RECEIVED AT LC1 | LC1 | ○ | ○ | ○ | ×(LOC) |
| | LC2 | ○ | ○ | ○ | ○(RDI) |
| | LC3 | ○ | ○ | ○ | ○ |
| | LC4 | × | ×(LOC) | × | × |

NETWORK RELAY DEVICE

CROSS-REFERENCE TO RELATED APPLICATION

The present application claims priority from Japanese Patent Application No. 2013-095392 filed on Apr. 30, 2013, the content of which is hereby incorporated by reference into this application.

TECHNICAL FIELD OF THE INVENTION

The present invention relates to a network relay device. For example, the present invention relates to a network relay device having a function that assigns a plurality of ports to groups and that limits a communication band for relay of a frame among the respective groups.

BACKGROUND OF THE INVENTION

For example, Japanese Patent Application Laid-Open Publication No. 2011-91477 (Patent Document 1) describes a method of synchronizing a plurality of FDBs with each other in a chassis-type switching hub. More specifically, each of line cards generates a learning-use frame when a registered content of each FDB is changed, and the learning-use frame is transmitted toward the other line card while a transmission rate is controlled. Japanese Patent Application Laid-Open Publication No. 2012-209855 (Patent Document 2) describes a method of effectively learning the FDB in the chassis-type switching hub. More specifically, a representative line card is determined, and each line card enables the representative line card to perform a learning process based on a learning notification when the FDB information of a received packet has not been learned yet, and then, the FDB of its own is updated based on a learning notification transmitted in multicast transmission from the representative line card. The representative line card limits a flow rate in the multicast transmission.

In a frame relay device that divides the same VLAN into two subnets for management, Japanese Patent Application Laid-Open Publication No. 2012-130084 (Patent Document 3) describes a method of distinguishing a communication inside the same subnet from a communication between the subnets. More specifically, the device has various functions for registering a flag indicating either the communication inside the same subnet or the communication between the subnets in a learning table together with a transmission-source address. Moreover, this frame relay device controls a band upon the communication between the subnets. More specifically, this frame relay device controls the band by using a band controlling unit inside a second domain processing unit when a frame received by a first domain processing unit corresponding to the first subnet is transmitted to a second domain processing unit corresponding to the second subnet.

SUMMARY OF THE INVENTION

For example, as represented by a VLAN (Virtual Local Area Network) or others, a technique of structuring a plurality of broadcast domains in one switching device (network relay device) has been known. However, a communication provider or others desires sometimes to limit a communication band for apart of the relay when the frame is relayed inside the same broadcast domain. A case is cited, for example, in which the communication provider desires to limit the communication band when the frame is relayed between groups that are a part inside an organization while assigning the same broadcast domain to the organization regarded as one unit.

In such a case, it is beneficial to, for example, use a switching device having a communication band limiting function inside the device. The communication band limiting function is a function that assigns not only the broadcast domain but also a plurality of ports to the groups inside the device, and besides, that limits the communication band for the relay of the frame between arbitral groups. This function itself for limiting the communication band is normally referred to as QoS (Quality of Service) or others.

On the other hand, for example, in the communication provider or others, so-called chassis-type switching device to which many terminals are connectable is used in many cases. In the chassis-type switching device, high reliability is particularly required. When, for example, the configuration as described in the Patent Document 3 is used under such circumstances, there is a risk of loss of the limiting function for the communication band in the entire switching device if a fault occurs in one of band limiting units.

The present invention has been made in consideration of such circumstances, and one of preferred aims of the present invention is to provide a network relay device capable of improving fault tolerance. The above and other preferred aims and novel characteristics of the present invention will be apparent from the description of the present specification and the accompanying drawings.

The typical embodiment of the inventions disclosed in the present application will be briefly described as follows.

A network relay device according to the present embodiment has a plurality of line cards each of which has a port, and relays a frame. Each of the plurality of line cards has: a band limiting unit for limiting a communication band of the frame; and an internal communicability monitoring unit for monitoring the communicability to/from each of the other line cards by transmitting and receiving an internal monitoring frame to/from each of the other line cards. In this case, when a first line card which is any one of the plurality of line cards receives the frame at the port of its own, the first line card refers to monitoring results obtained by the internal communicability monitoring units of the other line cards in addition to a monitoring result obtained by the internal communicability monitoring unit of its own, and determines a transmission destination from the band limiting units of the other line cards based on the monitoring results. Then, the first line card transmits the received frame toward the transmission destination. Meanwhile, the line card, which has received the frame from the first line card, limits the communication band of the frame by using the band limiting unit of its own, and then, transmits the frame to a predetermined port among the ports of the plurality of line cards.

When the effects obtained by the typical embodiment of the present invention disclosed in the present application are briefly described, the fault tolerance can be improved in the network relay device.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and others), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and others are mentioned, the substantially approximate and similar shapes and others are included therein unless otherwise stated or except the case where it is conceivable that they are apparently excluded in principle. The same goes for the numerical value and the range described above.

Hereinafter, embodiments of the present invention will be described in detail based on the accompanying drawings. Note that the same components are basically denoted by the same reference symbols throughout all drawings for describing the embodiments, and the repetitive description thereof will be omitted.

(First Embodiment)

<<Communication Band Limiting Function of Network Relay Device>>

Figure 9:
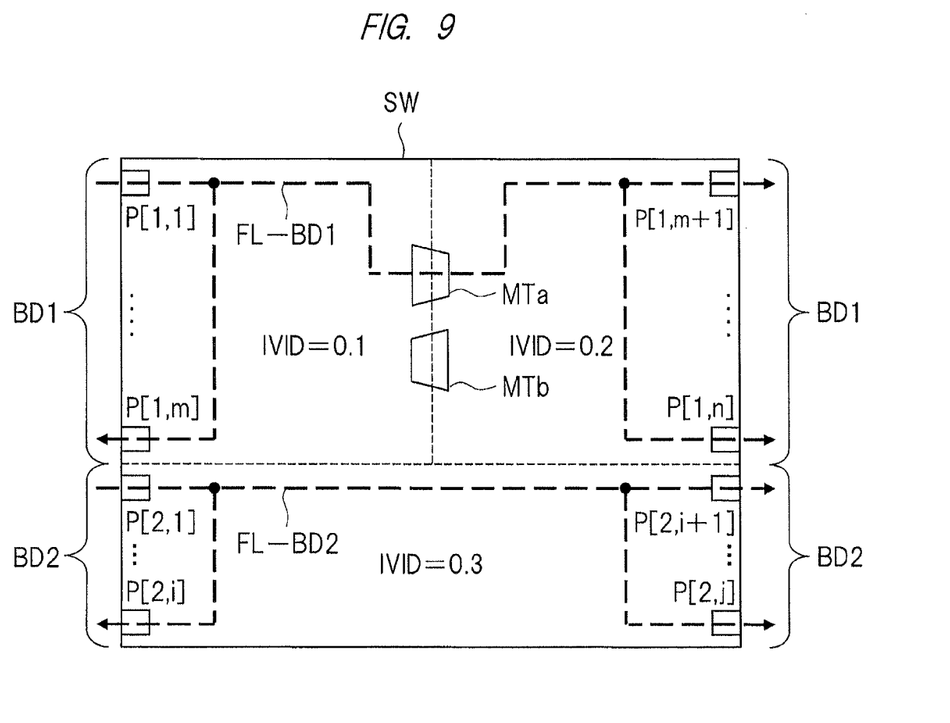
FIG. 9 is a schematic diagram illustrating a schematic operational example of a limiting function of a communication band of the network relay device according to the first embodiment of the present invention.

FIG. 9 is a schematic diagram illustrating a schematic operational example of a communication band limiting function of a network relay device of a first embodiment of the present invention. A switching device (a network relay device) SW illustrated in FIG. 9 is provided with a plurality of ports P[1, 1] to P[1, n] and P[2, 1] to P[2, j] and meter units (band limiting units) MTa and MTb. In this example, the P[1, 1] to P[1, n] belong to the same broadcast domain BD1, and the P[2, 1] to P[2, j] belong to the same broadcast domain BD2 that is different from the BD1. More specifically, for example, the same VLAN is set to the BD1, and the same VLAN that is different from that of the BD1 is set to the BD2.

Inside the device, internal identifiers IVIDs that are different from each other are set to the P[1, 1] to P[1, m] (the first port group) and the P[1, m+1] to P[1, n] (the second port group) among the plurality of ports P[1, 1] to P[1, n] belonging to the broadcast domain BD1, respectively. A relation of "IVID=0.1" is set to the first port group as the first internal identifier, and a relation of "IVID=0.2" is set to the second port group as the second internal identifier. Moreover, inside the device, a relation of "IVID=0.3" is also set to the plurality of ports P[2, 1] to P[2, j] as an internal identifier that is different from the first and second internal identifiers.

In such a configuration, for example, if flooding occurs for a frame FL-BD1 received at the port P[1, 1], the FL-BD1 is flooded to ports among the plurality of ports P[1, 1] to P[1, n] that belong to the broadcast domain BD1 except for the P[1, 1]. Similarly, if flooding occurs for a frame FL-BD2 received at the port P[2, 1], the FL-BD2 is flooded to ports among the plurality of ports P[2, 1] to P[2, j] that belong to the broadcast domain BD2 except for the P[2, 1].

In this case, in the switching device SW of FIG. 9, the communication band limiting function is set so that, when a frame is relayed so as to be bridged between previously-set predetermined port groups, a communication band of the frame received at one of the port groups (in this case, the first port group) is limited, and then, the frame is relayed to the other of the port groups (in this case, the second port group). In accordance with this setting, the SW limits the communication band of the frame FL-BD1 received at the first port group (for example, P[1, 1]) by using the meter unit (the band limiting unit) MTa, and then, relays the frame to the second port group (P[1, m+1] to P[1, n]).

Moreover, when the frame is relayed inside the same port group (for example, the first port group), the switching device SW does not limit the communication band of the frame FL-BD1 received at any port (for example, P[1, 1]) inside the same port group, and relays the frame to any other port (for example, P[1, m] or others). As contrary to the meter unit MTa, note that the meter unit (the band limiting unit) MTb limits the communication band of the frame when the frame is relayed from the second port group to the first port group. The communication band limiting function can also determine a limiting source and a limiting destination in the limitation of the communication band, and also can set to use only either the MTa or the MTb depending on cases.

<<Outline of Principal Part of Network Relay Device>>

Figure 1:
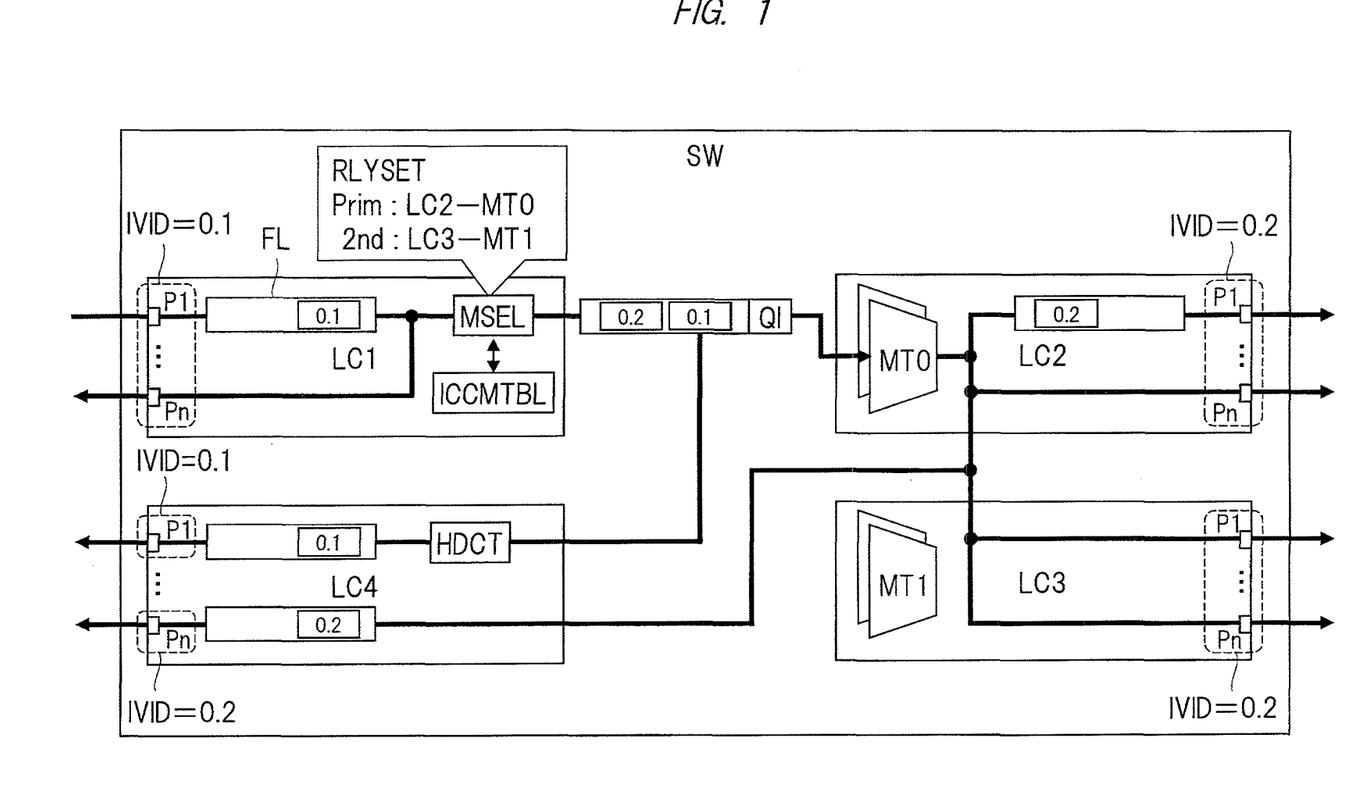
FIG. 1 is a schematic diagram illustrating the entire structural example of a principal part of a network relay device according to the first embodiment of the present invention, and an operational example upon normal operation.

FIG. 1 is a schematic diagram illustrating an entire structural example of a principal part of the network relay device of the first embodiment of the present invention, and an operational example upon normal operation. The switching device (the network relay device) SW illustrated in FIG. 1 is provided with a plurality of (here, four) line cards (first to fourth line cards) LC1 to LC4. Each of the LC1 to LC4 has a port, so that the frame is relayed. In this example, each of the LC1 to LC4 has a plurality of ports P1 to Pn, so that the frame is relayed among the ports P1 to Pn of its own, or the frame is relayed to the other line card. However, at least any one/some of the LC1 to LC4 may have a configuration provided with only one port enabling a high-speed operation depending on cases.

In the example illustrated in FIG. 1, the plurality of ports P1 to Pn in the first line card LC1 and any one/some of ports including the port P1 in the fourth line card LC4 belong to the first port group described in FIG. 9, and the first internal identifier (IVID=0.1) is set to the ports. Moreover, the plurality of ports P1 to Pn in the second and third line cards LC2 and LC3 and any one/some of ports including the port Pn in the LC4 belong to the second port group, and the second internal identifier (IVID=0.2) is set to the ports.

Each of the plurality of line cards LC1 to LC4 includes: a meter unit (a band limiting unit) MT for limiting the communication band of the frame; a meter selection unit MSEL for determining the meter unit which is a transmission destination; an internal communicability monitoring table ICCMTBL; and relay setting information RLYSET as described in FIG. 9. In this case, as represented from them, only a meter unit MT0 of the second line card LC2, a meter unit MT1 of the third line card LC3, and the MSEL, ICCMTBL and RLYSET of the first line card LC1 are illustrated.

In the relay setting information RLYSET of the first line card LC1, the meter unit MT0 of the second line card LC2 is previously set as a first candidate for the transmission destination (in other words, for a normal use), and the meter unit MT1 of the third line card LC3 is previously set as a second candidate for the transmission destination (in other words, for a preliminary use). Note that the setting contents are merely one example. In the RLYSET of each line card, a meter unit MT of any line card can be previously set as the first and second candidates.

Under such circumstances, a case that the flooding state is generated in a frame FL received at the port P1 of the first line card LC1 is assumed. In this case, the LC1 floods the FL to a port (Pn or others) belonging to the first port group inside the same line card (LC1) and to a port (P1 or others inside the LC4) belonging to the first port group inside the other line card, and besides, transmits the frame to the meter selection unit MSEL. The MSEL determines the meter unit MT0 (that is, the first candidate for the transmission destination) of the second line card LC2 as the transmission destination based on the relay setting information RLYSET and based on information of the internal communicability monitoring table ICCMTBL described in detail later, so that the frame is transmitted to the MT0.

The second line card LC2 that has received the frame FL from the first line card LC1 limits the communication band of the frame FL by using the meter unit MT0, and then, floods the frame to a port belonging to the second port group. In this example, the LC2 floods the FL with the limited communication band to the ports (P1 to Pn) belonging to the second port group inside the third line card LC3 and the port (Pn or others) belonging to the second port group inside the fourth line card LC4 in addition to the ports (P1 to Pn) belonging to the second port group inside the LC2.

Although not particularly limited, note that the following process is performed to a header of the frame in the structural example of FIG. 1. First, when the first line card LC1 receives the frame FL at the port P1, the first line card LC1 adds the first internal identifier (IVID=0.1) corresponding to the P1 to the header of the FL. When the LC1 transmits the FL to the other port (Pn or others) of its own corresponding to the identifier "IVID=0.1", the LC1 transmits the FL without any change to the port. On the other hand, when the LC1 transmits the FL to the other line card, the LC1 further adds the second internal identifier (IVID=0.2) and band limiting information QI required for limiting the communication band to the header of the FL.

The fourth line card LC4, which has received the frame with the header containing the first and second internal identifiers (IVID=0.1 and 0.2) and the band limiting information QI, removes 0.2 and QI from the header by using a header control unit HDCT, and transmits the frame with the header containing 0.1 to a port (P1 or others) of its own corresponding to the identifier "IVID=0.1". Moreover, the second line card LC2, which has received the frame with the header containing 0.1, 0.2 and QI, allows the meter unit (the band limiting unit) MT0 to limit the communication band based on QI, removes 0.1 and QI from the header, and transmits the frame with the header containing 0.2 to a predetermined port inside a predetermined line card corresponding to the identifier "IVID=0.2". When each line case transmits the frame from each port, each line card converts 0.1 and 0.2 into a predetermined VLAN identifier or others.

Figure 2:
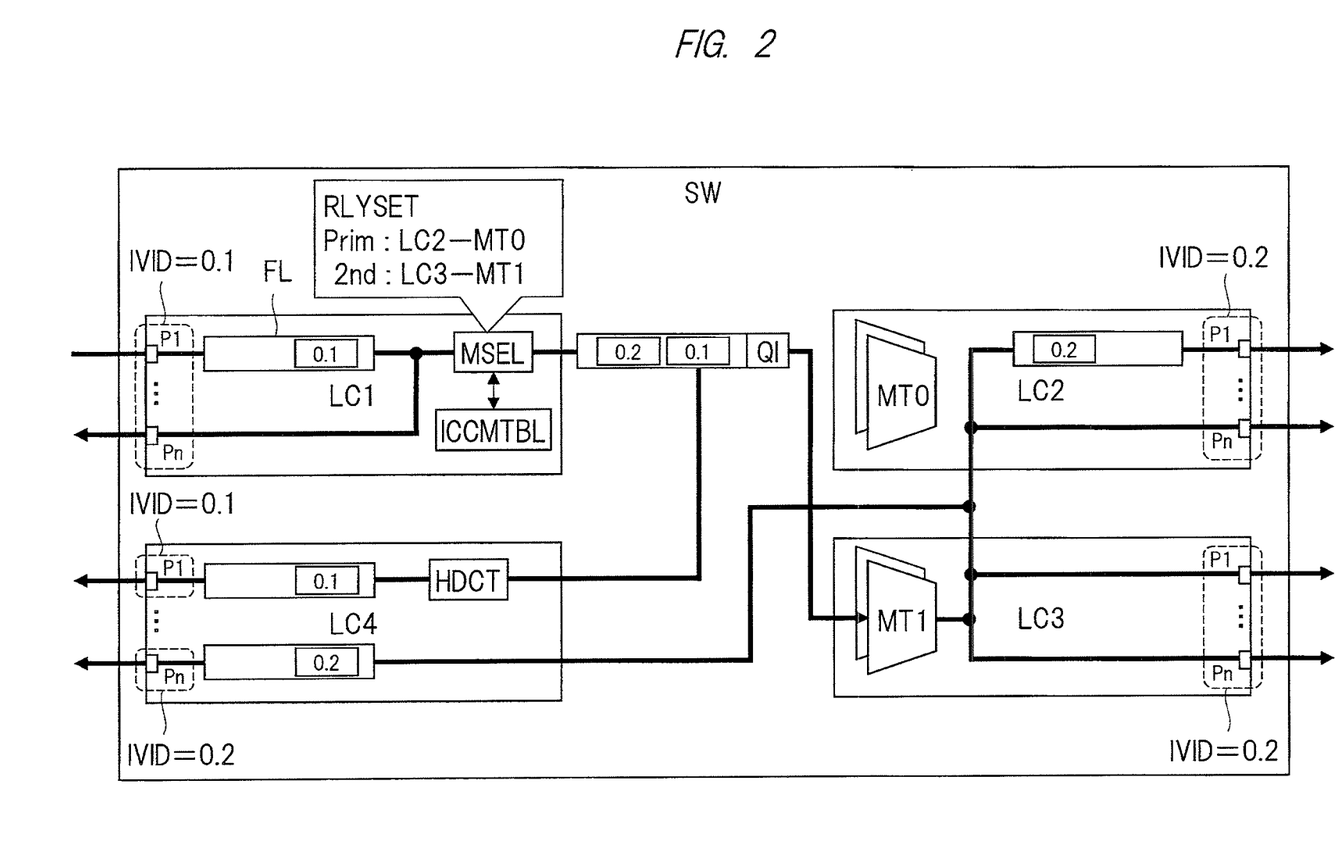
FIG. 2 is a schematic diagram illustrating an operational example upon fault occurrence in the network relay device of FIG. 1.

FIG. 2 is a schematic diagram illustrating an operational example upon fault occurrence in the network relay device of FIG. 1. For example, the operation is switched to such an operation as illustrated in FIG. 2 when a fault occurs in a communication path for a frame between the second line card LC2 and the other line card (for example, the third line card LC3 or the fourth line card LC4) but a communication path for a frame between the LC3 and the other line card is normal in FIG. 1. In the example of FIG. 2, the first line card LC1 floods the frame FL, which has been received at the port P1, to a port belonging to the first port group as similar to the case of FIG. 1, and besides, transmits the frame to the meter selection unit MSEL. As different from the case of FIG. 1, the MSEL determines the transmission destination as the meter unit MT1 (that is, the second candidate for the transmission destination) of the third line card LC3, and transmits the frame to the MT1. The LC3, which has received the FL from the LC1, limits the communication band of the frame FL by using the MT1 in place of the LC2 in the case of FIG. 1, and then, floods the FL to a port belonging to the second port group.

As described above, the switching device (the network relay device) SW of FIG. 1 is provided with such meter units (band limiting units) MT0 and MT1 having a redundant configuration as being bridged between different line cards. Thus, even when the fault occurs in, for example, the second line card LC2, the communication band can be limited by using the third line card LC3 so that the fault tolerance can be improved. Moreover, as described above, since the meter units MT of any line cards can be determined for each of the line cards as the first and second candidates for the transmission destination, the loads caused in the practical limitation of the communication band can be diffused in addition to the improvement of the fault tolerance from the viewpoint of dispersion of risk.

Here, in order to allow the meter selection unit MSEL of the first line card LC1 to determine the meter unit MT which is the transmission destination so as to avoid the fault, it is required for the LC1 to recognize a communicability state between the second line card LC2 and the other line card and a communicability state between the third line card LC3 and the other line card. Accordingly, each of the line cards (for example, the LC1) is provided with an internal communicability monitoring unit described later so as to determine the meter unit which is the transmission destination from the meter units of the other line cards (for example, the LC2 and the LC3) based on the monitoring result (that is, the internal communicability monitoring table ICCMTBL) of the internal communicability monitoring unit of each of LC1 to LC4. Then, each line card (LC1) transmits the frame, which has been received at the predetermined port (in this case, the P1), to the transmission destination.

<<Outline of Internal Communicability Monitoring Unit>>

Figure 3A:
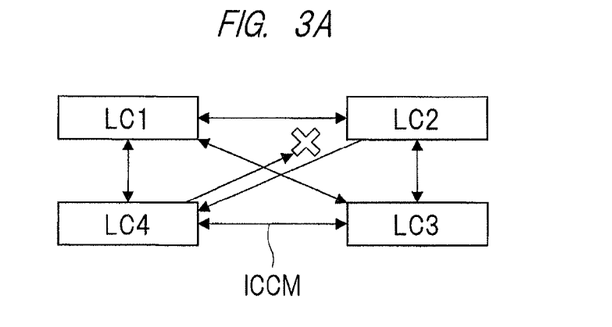
FIG. 3A is an explanatory diagram illustrating one example of functions of an internal communicability monitoring unit included in each line card in the network relay device of FIG. 1.
Figure 3B:
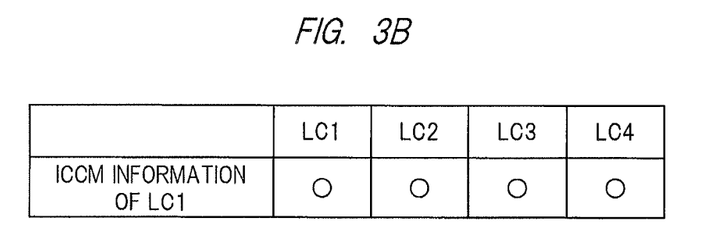
FIG. 3B is an explanatory diagram illustrating one example of functions of an internal communicability monitoring unit included in each line card in the network relay device of FIG. 1.
Figure 3C:
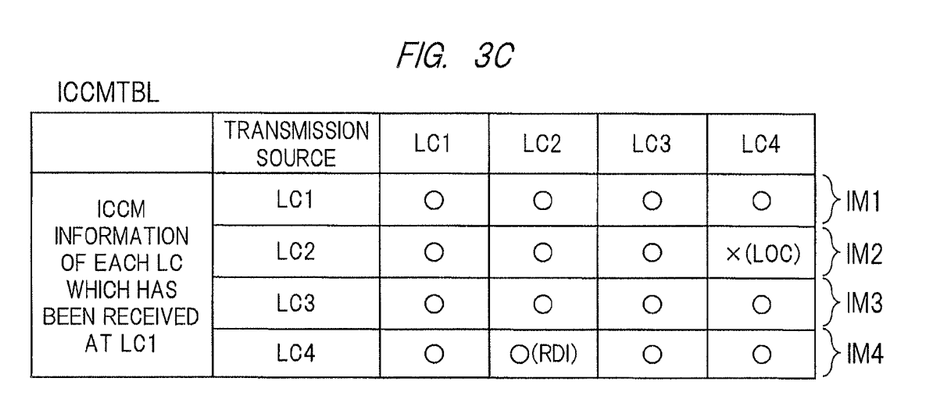
FIG. 3C is an explanatory diagram illustrating one example of functions of an internal communicability monitoring unit included in each line card in the network relay device of FIG. 1.

FIGS. 3A to 3C are explanatory diagrams each illustrating one example of functions of the internal communicability monitoring unit included in each of the line cards in the network relay device of FIG. 1. As illustrated in FIG. 3A, each of the plurality of line cards LC1 to LC4 is provided with the internal communicability monitoring unit that monitors the communicability to/from each of the other line cards by transmitting and receiving an internal monitoring frame ICCM to/from each of the other line cards. For example, the internal communicability monitoring unit of the LC1 periodically transmits the ICCM to each of the LC2 to LC4 with a predetermined transmitting interval. Meanwhile, if the ICCM from the LC1 is not received within a predetermined receiving period (for example, 3.5 times the transmitting interval or others), the internal communicability monitoring unit of each of the LC2 to LC4 determines that the LC1 has the fault in the communicability.

In the example of FIG. 3A, a fault occurs in the communication path from the fourth line card LC4 to the second line card LC2. In this case, the internal communicability monitoring unit of the first line card LC1 can normally receive the internal monitoring frame ICCM from the internal communicability monitoring unit of each of the line cards LC2 to LC4 of the second to fourth line cards, and therefore, determines that the communicability to/from each of the LC2 to LC4 is normal as illustrated in the monitoring result of FIG. 3B and the monitoring result IM1 illustrated in FIG. 3C.

On the other hand, the internal communicability monitoring unit of the second line card LC2 cannot normally receive the internal monitoring frame ICCM from the internal communicability monitoring unit of the fourth line card LC4, and therefore, determines that the communicability to/from the LC4 is in a LOC (Loss Of Continuity) state as illustrated in the monitoring results IM of FIG. 3C. In this case, when the internal communicability monitoring unit of the LC2 transmits the ICCM to the internal communicability monitoring unit of the LC4, the internal communicability monitoring unit of the LC2 transmits the ICCM in a state that a flag is on a RDI (Remote Defect Indication) bit of the ICCM. The internal communicability monitoring unit of the LC4 receives the ICCM from the internal communicability monitoring unit of the LC2, and determines that the communicability to/from the LC2 is in the RDI state as illustrated in the monitoring results IM4 of FIG. 3C.

Here, as illustrated in FIG. 3C, the first line card LC1 acquires the monitoring results IM1 to IM4 obtained by the internal communicability monitoring units of the other second to fourth line cards LC2 to LC4 in addition to those of the internal communicability monitoring unit of its own (LC1). In this manner, as illustrated in FIG. 3C, the LC1 recognizes the monitoring results IM1 to IM4 obtained by the internal communicability monitoring units of all the line cards, and stores the IM1 to the IM4 in the internal communicability monitoring table ICCMTBL. At this time, a method of acquiring the monitoring results of the internal communicability monitoring units of the LC2 to LC4 by the LC1 can be appropriately determined. For example, various methods are cited, such as a method in which the LC1 periodically issues a request to the LC2 to the LC4, and the LC2 to LC4 respond to the request, or a method in which each of the LC2 to LC4 spontaneously notifies each line card of a changed content when the monitoring results of the LC2 to LC4 of their own are changed, and the LC1 always monitors the notification.

<<Outline of Meter Selection Unit>>

Figure 4A:
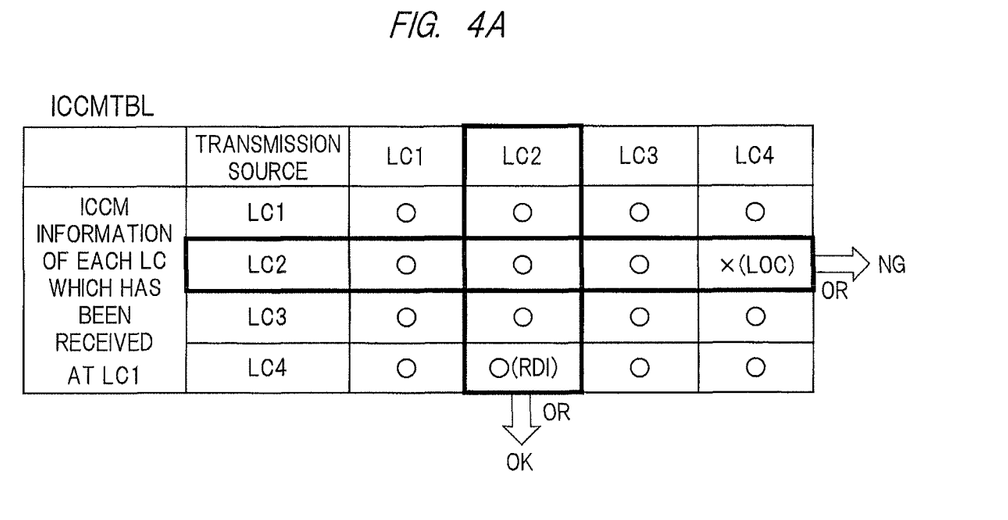
FIG. 4A is an explanatory diagram illustrating an operational example operated when a meter selection unit of FIG. 1 determines a meter unit (a band limiting unit) based on an internal communicability monitoring table of FIG. 3C.
Figure 4B:
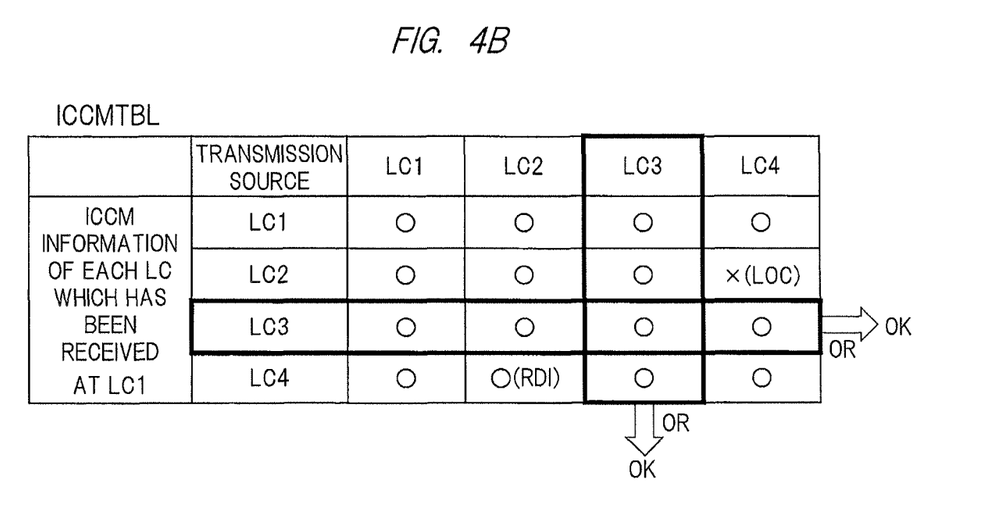
FIG. 4B is an explanatory diagram illustrating an operational example operated when a meter selection unit of FIG. 1 determines a meter unit (a band limiting unit) based on an internal communicability monitoring table of FIG. 3C.

FIGS. 4A and 4B are explanatory diagrams each illustrating an operational example operated when the meter selection unit of FIG. 1 determines the meter unit (the band limiting unit) based on the internal communicability monitoring table of FIG. 3C. For example, when the meter selection unit MSEL of the first line card LC1 receives the frame at the port of its own, the meter selection unit MSEL refers to the internal communicability monitoring table ICCMTBL in which the monitoring results obtained by the internal communicability monitoring units of the other line cards are stored as illustrated in FIG. 3C in addition to those by its own. Then, the MSEL of the LC1 determines a band limiting unit which is the transmission destination from the meter units (the band limiting units) of the other line cards based on the monitoring results.

More specifically, as illustrated in FIG. 4A, the meter selection unit MSEL of the first line card LC1 first refers to the monitoring results for the LC2 (that is, the results of FIG. 4A in a vertical direction) obtained by the internal communicability monitoring units of the other line cards LC1, LC3 and LC4 in addition to the monitoring results (that is, the results of FIG. 4A in a horizontal direction) obtained by the internal communicability monitoring unit of the second line card LC2. In other words, the MSEL of the LC1 refers to all communicability to/from the LC2 serving as the communication counterpart in the internal communicability monitoring table ICCMTBL.

As a result, if all communicability to/from the second line cards LC2 serving as the communication counterpart is normal, the meter selection unit MSEL of the first line card LC1 determines the meter unit which is the transmission destination as the meter unit MT0 of the LC2. In this case, a communication path illustrated in FIG. 1 is structured. On the other hand, if any fault is detected in the communicability to/from the LC2 serving as the communication counterpart, the LC1 performs a processing as illustrated in FIG. 4B. In the example of FIG. 4A, the LC2 is in the LOC state with respect to the fourth line card LC4, and therefore, the processing illustrated in FIG. 4B is performed. Note that the RDI state may be regarded as normal or fault.

As similar to the case of FIG. 4A, in FIG. 4B, the meter selection unit MSEL of the first line card LC1 refers to the monitoring results for the LC3 (that is, the results of FIG. 4A in a vertical direction) obtained by the internal communicability monitoring units of the other line cards LC1, LC2 and LC4 in addition to the monitoring results (that is, the results of FIG. 4A in a horizontal direction) obtained by the internal communicability monitoring unit of the second line card LC3. In other words, the MSEL of the LC1 refers to all communicability to/from the LC3 serving as the communication counterpart in the internal communicability monitoring table ICCMTBL. In the example of FIG. 4B, all communicability to/from the second line cards LC3 serving as the communication counterpart is normal, and therefore, the MSEL of the LC1 determines the meter unit which is the transmission destination as the meter unit MT1 of the LC3. In this case, a communication path illustrated in FIG. 2 is structured.

As described above, the meter units (the band limiting units) having the redundant configuration are provided so as to be bridged between the different line cards, and besides, the meter unit which is the transmission destination is determined from the meter units based on the monitoring results obtained by the internal communicability monitoring units of the other line cards in addition to the monitoring result by its own, so that the meter unit through which the fault is avoided can be determined, and the fault tolerance can be improved. Note that the first and second candidates are determined as the candidates for the transmission destination here. However, three or more candidates can be also similarly determined.

<<Details of Principal Part of Network Relay Device>>

Figure 5:
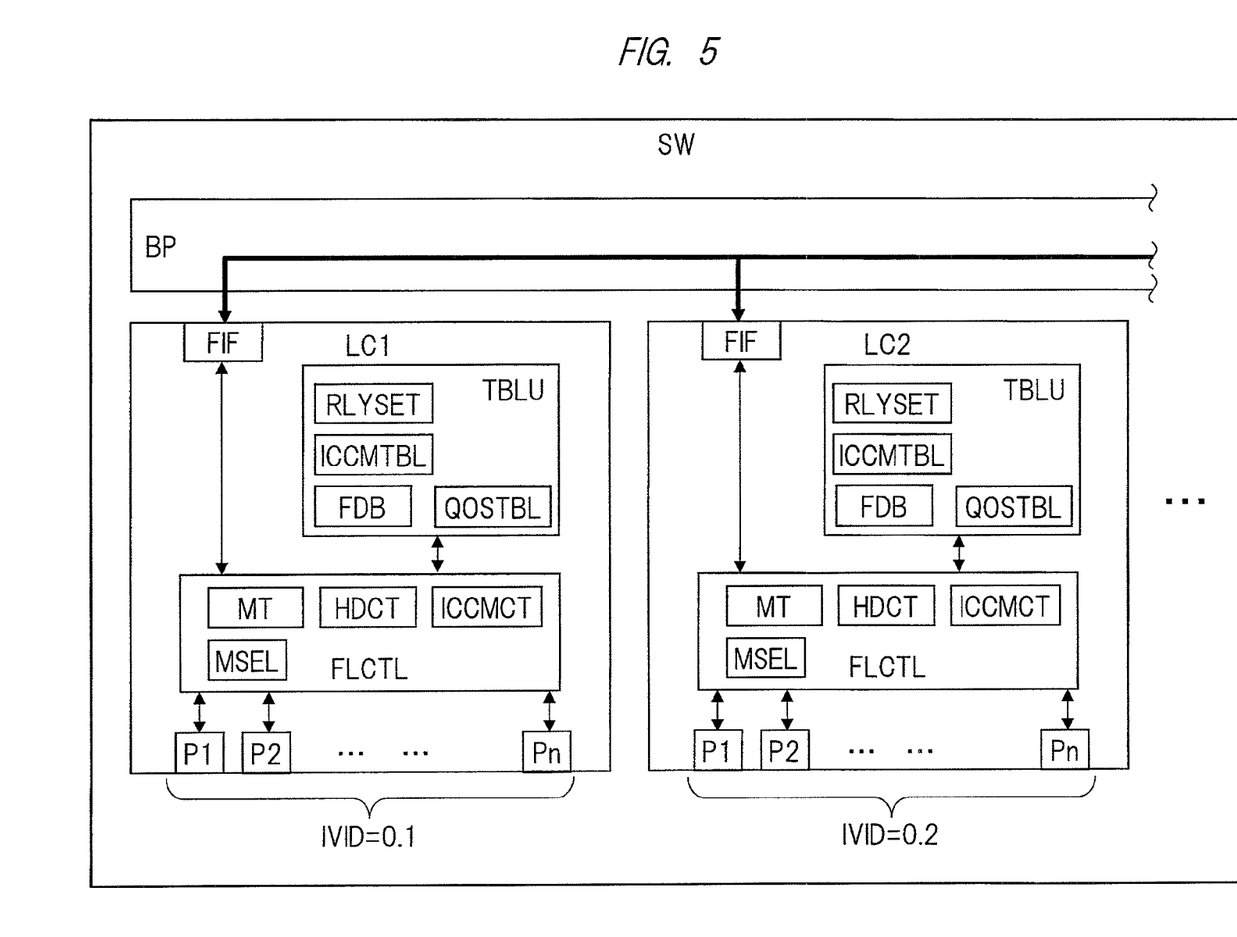
FIG. 5 is a block diagram illustrating a detailed structural example of the network relay device of FIG. 1.

FIG. 5 is a block diagram illustrating a detailed structural example of the network relay device of FIG. 1. A switching device (a network relay device) SW illustrated in FIG. 5 is configured by so-called chassis type switching device, and has a configuration in which a plurality of line cards LC1, LC2, . . . , and a back plane BP are mounted in one package. The BP is provided with slots to which a plurality of line cards are inserted, and the plurality of line cards can perform the communication via an internal communication line on the BP.

Each of the plurality of line cards LC1, LC2, . . . is provided with a plurality of ports P1 to Pn, a fabric interface FIF, a frame processing unit FLCTL and a table unit TBLU. To the P1 to Pn, terminals having predetermined MAC (Media Access Control) addresses or others are appropriately connected via a communication line. Here, a line card with a plurality of ports is exemplified for explanation. However, as described in FIG. 1, the line card may be a line card provided with only one port. The FIF is connected to the internal communication line on the back plane BP so as to be an interface operated in communication between the line cards.

The table unit TBLU is provided with an address table FDB and a band limiting table QOSTBL in addition to the relay setting information RLYSET and the internal communicability monitoring table ICCMTBL described above. The FDB stores a relation or others among the port, the MAC address existing beyond the port, the internal identifier set to the port group to which the port belongs, and the line card to which the port belongs. The QOSTBL stores, for example, a relation between the port and the port group (the internal identifier IVID), and various types of information relating to a band limiting condition for determining between what port groups the communication band is to be limited in the relay of the frame.

The frame processing unit FLCTL is provided with a header control unit HDCT and an internal communicability monitoring unit ICCMT in addition to the meter selection unit MSEL and the meter unit (the band limiting unit) MT described above. The HDCT performs various controlling processes (deletion, addition and conversion of information) relative to the header of the frame as explained in FIG. 1. As described in FIGS. 3A to 3C, the ICCMCT transmits and receives the internal monitoring frame ICCM to/from the other line card via the fabric interface FIF, and records the monitoring result for the communication in the internal communicability monitoring table ICCMTBL. Moreover, the ICCMCT acquires the monitoring result obtained by the ICCMCT of the other line card via the FIF, and records the monitoring result in the ICCMTBL.

In such a configuration, first, an operational example in a case that, for example, the flooding occurs because the destination of the frame received at the port P1 of the first line card LC1 is not acquired, will be explained. In this case, the frame processing unit FLCTL of the LC1 floods the frame to each of the ports belonging to the same port group as that of the P1. In the example of the case illustrated in FIG. 1, the FLCTL of the LC1 floods the frame to the ports P2 to Pn of its own, and besides, transmits the frame also to the other line card (LC4) so as to enable the other line card to flood the frame. In addition to this, the FLCTL of the LC1 further performs a processing by using the meter selection unit MSEL in order to flood the frame to a port which belongs to a different port group from that of the P1 and whose communication band is required to be limited.

That is, the frame processing unit FLCTL (the meter selection unit MSEL) of the first line card LC1 determines the meter unit MT of a predetermined line card as the transmission destination based on the relay setting information RLYSET and the internal communicability monitoring table ICCMTBL. Then, the FLCTL (MSEL), for example, adds information indicating the meter unit MT of the transmission destination to the header of the frame by using the header control unit HDCT, and then, transmits the frame to the MT which is the transmission destination.

The meter unit MT of the transmission destination limits the communication band of the received frame, and the frame processing unit FLCTL having the MT which is the transmission destination floods the frame with this limited communication band to a port belonging to a different port group from that of the port P1 of the first line card LC1. In the explanation of the case illustrated in FIG. 1, the FLCTL of the second line card LC2 having the meter unit MT which is the transmission destination floods the frame with the limited communication band to the ports P1 to Pn of its own, and besides, transmits the frame to the other line card (LC4) so as to enable the other line card to flood the frame although eliminated in FIG. 5.

Next, an operational example in which, for example, the destination of the frame received at the port P1 of the first line card LC1 is acquired, will be explained. In this case, the frame processing unit FLCTL of the LC1 retrieves the line card and the port which are the destination corresponding to the destination address of the frame by using the address table FDB and the band limiting table QOSTBL, and besides, determines whether or not the port of the destination belongs to the same port group and whether or not the limitation of the communication band is required. For example, the FLCTL compares the port group to which the port P1 belongs with the port group to which the destination address belongs and which is registered in the FDB, and determines whether or not the port groups are the same port group as each other, and besides, determines whether or not the limitation of the communication band is required based on the QOSTBL.

If the port of the destination belongs to the same port group, the frame processing unit FLCTL of the first line card LC1, for example, adds information indicating the line card and the port which are the destination to the header of the frame by using the header control unit HDCT, and then, transmits the frame to the line card of the destination. Then, the line card of the destination relays the frame to the port of the destination based on the information of the header. Note that the FLCTL of the LC1 relays the frame without any change to the port of the destination if the line card of the destination is the LC1.

On the other hand, in the case that the limitation of the communication band is required since the port of the destination belongs to a different port group, the frame processing unit FLCTL (the meter selection unit MSEL) of the first line card LC1, for example, adds the information indicating the line card and the port which are the destination to the header of the frame by using the header control unit HDCT. Then, the MSEL transmits the frame to the meter unit MT which is the transmission destination as similar to the case of the flooding. The MT which is the transmission destination limits the communication band of the frame, and the FLCTL having the MT which is the transmission destination transmits the frame with this limited communication band to the line card which is the destination, or relays the frame to the port of its own, based on the information of the header. In the former case, the FLCTL of the line card which is the destination relays the frame to the port which is the destination, based on the information of the header.

Figure 6:
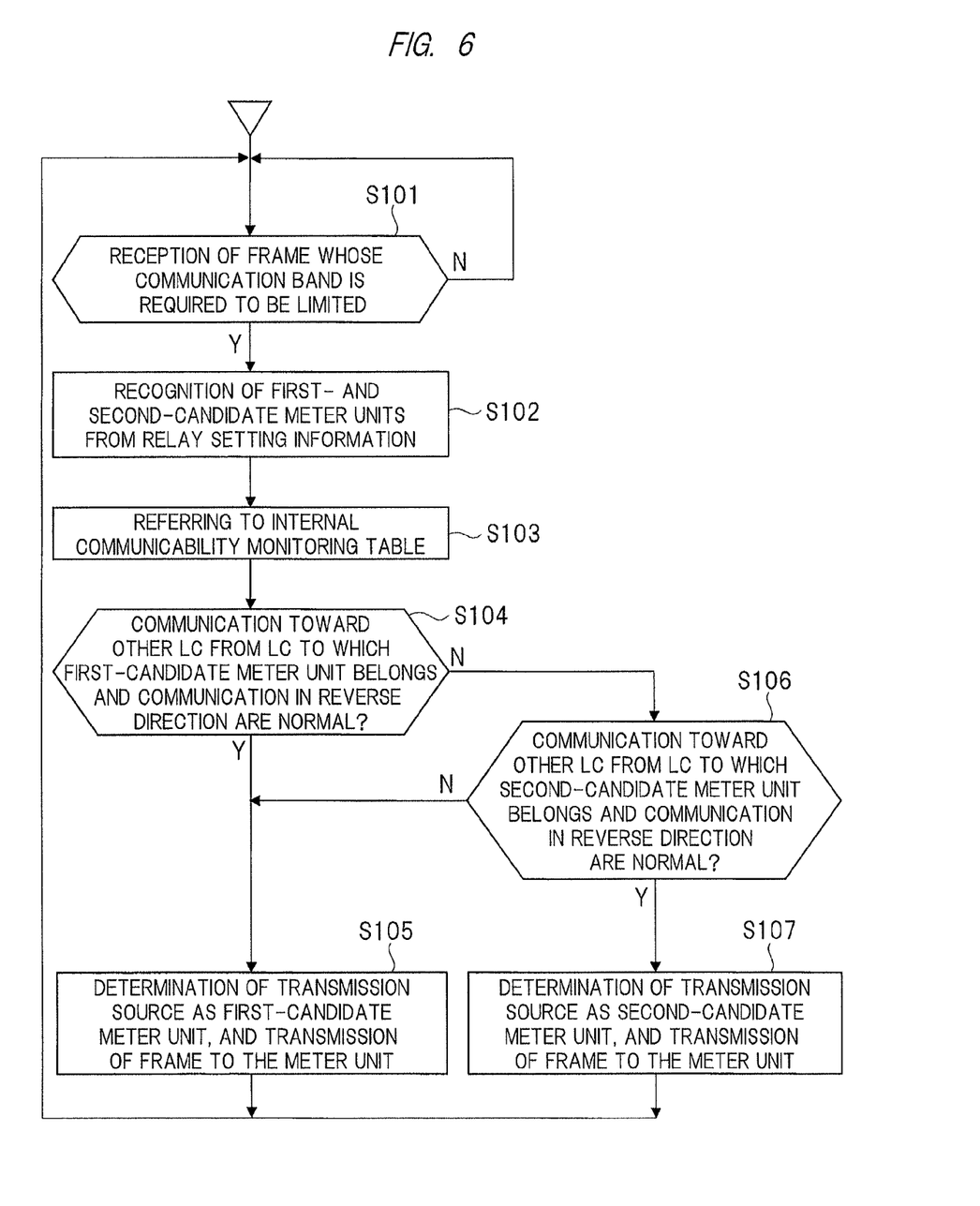
FIG. 6 is a flowchart illustrating an operational example of a meter selection unit of the network relay device of FIG. 5.

FIG. 6 is a flowchart illustrating an operational example of the meter selection unit in the network relay device of FIG. 5. As illustrated in FIG. 6, when the meter selection unit MSEL receives the frame whose communication band is required to be limited (step S101), the meter selection unit MSEL first recognizes the meter units (the band limiting units) MT which are the first and second candidates for the transmission destination by referring to the relay setting information RLYSET (step S102). Next, the MSEL refers to the internal communicability monitoring table ICCMTBL (step S103). Subsequently, the MSEL determines whether or not all of the communication from the line card LC to which the first-candidate meter unit belongs to the other LC and the communication in its reversed direction are normal based on the ICCMTBL (step S104). In other words, the MSEL determines whether or not all communicability to/from the LC as the communication counterpart to which the first-candidate meter unit belongs is normal.

In step S104, if that all communicability to/from the line card LC as the communication counterpart to which the first-candidate meter unit belongs is normal, the meter selection unit MSEL determines the first-candidate meter unit as the transmission destination, and transmits the frame received in step S101 to this meter unit (step S105). On the other hand, if the fault (that is, the LOC state or the RDI state) is detected in the communicability to/from the LC as the communication counterpart to which the first-candidate meter unit belongs in step S104, the MSEL determines whether or not all communicability to/from the LC as the communication counterpart to which the second-candidate meter unit belongs is normal (step S106). Here, if all communicability is normal, the MSEL determines the second-candidate meter unit as the transmission destination, and transmits the frame received in step S101 to the meter unit (step S107).

If the fault is detected also in the communicability to/from the LC as the communication counterpart to which the second-candidate meter unit belongs in step S106, the meter selection unit MSEL performs the processing of step S105 although not particularly limited. However, practically, a predetermined processing depending on the fault state is separately required. Also, here, the processing content has been designed for always putting the priority on the first candidate. However, depending on cases, the almost equal priorities may be put on the first and second candidates. That is, for example, after the processing has proceeded to step S107, the processing content may be designed so that the transmission destination is set to the second-candidate meter unit regardless of the state of the communicability accompanied with the first candidate, and then, the transmission destination is changed to the first-candidate meter unit if the fault is detected in the communicability accompanied with the second candidate, and besides, if all communicability accompanied with the first candidate is normal.

As described above, by using the network relay device of the present first embodiment, the fault tolerance can be typically improved.

(Second Embodiment)

<<Monitoring Result of Internal Communicability Monitoring Unit>>

Figure 7A:
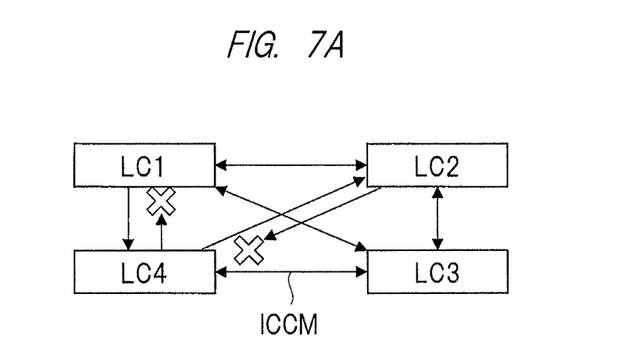
FIG. 7A is an explanatory diagram illustrating one example of a monitoring result of an internal communicability monitoring unit included in each line card of a network relay device according to a second embodiment of the present invention.
Figure 7B:
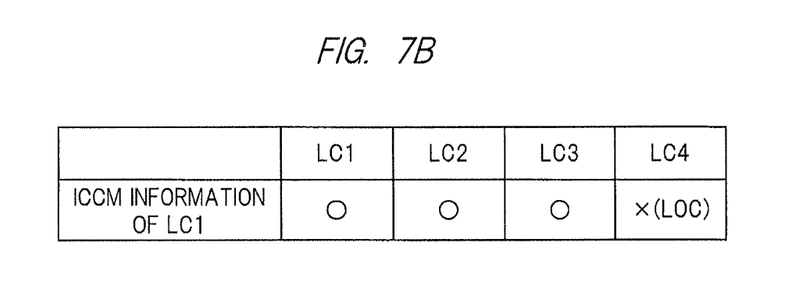
FIG. 7B is an explanatory diagram illustrating one example of a monitoring result of an internal communicability monitoring unit included in each line card of the network relay device according to the second embodiment of the present invention.
Figure 7C:
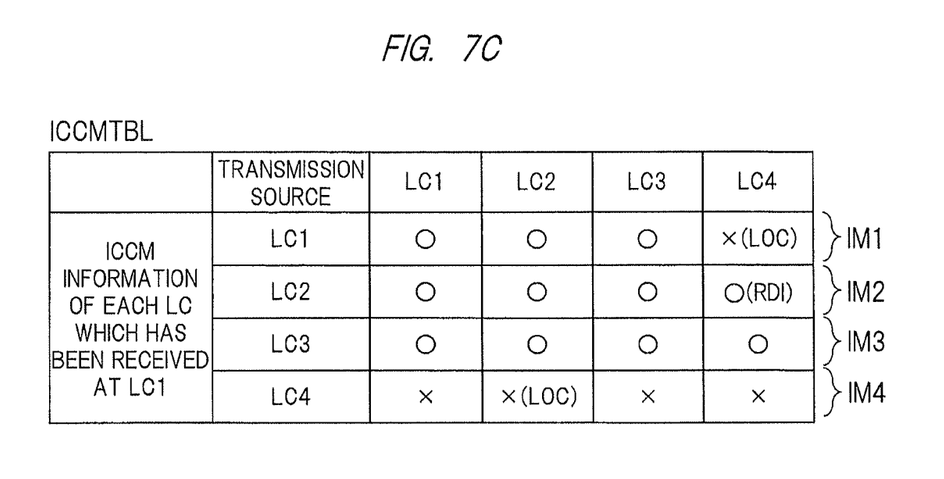
FIG. 7C is an explanatory diagram illustrating one example of a monitoring result of an internal communicability monitoring unit included in each line card of the network relay device according to the second embodiment of the present invention.

FIGS. 7A to 7C are explanatory diagrams each illustrating one example of a monitoring result of an internal communicability monitoring unit contained in each line card in a network relay device according to a second embodiment of the present invention. The network relay device according to the second embodiment has the same configuration and operation as those of the first embodiment, except for the partial addition of the operation of the meter selection unit as described later. In FIGS. 7A to 7C, the fault occurs in a different part from that of the above-described cases of FIGS. 3A to 3C, which results in a different monitoring result. The detailed method of monitoring the internal communicability monitoring unit is the same as those illustrated in FIGS. 3A to 3C, and therefore, the detailed description thereof will be omitted.

In the example of FIG. 7A, the faults occur in a communication path from the fourth line card LC4 to the first line card LC1 and a communication path from the second line card LC2 to the fourth line card LC4. In this case, the internal communicability monitoring unit of the first line card LC1 cannot receive the internal monitoring frame ICCM from the internal communicability monitoring unit of the fourth line card LC4 within a predetermined receiving period, and therefore, it is determined that the communicability to/from the LC4 is in the LOC state as illustrated in the monitoring result of FIG. 7B and the monitoring result IM1 of FIG. 7C. Also, the internal communicability monitoring unit of LC4 cannot receive the ICCM from the internal communicability monitoring unit of the LC2 within a predetermined receiving period, and therefore, it is determined that the communicability to/from the LC2 is in the LOC state as illustrated in the monitoring result IM4 of FIG. 7C. Further, accordingly, the internal communicability monitoring unit of LC2 determines that the communicability to/from the LC4 is in the RDI state as illustrated in the monitoring result IM2 of FIG. 7C.

As illustrated in FIG. 7C, the internal communicability monitoring unit of the first line card LC1 acquires the monitoring results IM1 to IM4 obtained by the internal communicability monitoring units of the other line cards LC2 to LC4 in addition to those of the internal communicability monitoring unit obtained by its own (LC1) as similar to the case of FIG. 3C, and stores the IM1 to the IM4 in the internal communicability monitoring table ICCMTBL. However, in this case, as illustrated in the monitoring result IM4 of FIG. 7C, the monitoring result acquired from the internal communicability monitoring unit of the LC4 by the internal communicability monitoring unit of the LC1 is inaccurate. This is because the internal communicability monitoring unit of the LC1 cannot originally normally receive the information from the internal communicability monitoring unit of the LC4 as illustrated in FIGS. 7A and 7B.

<<Operation of Meter Selection Unit>>

Figure 8:
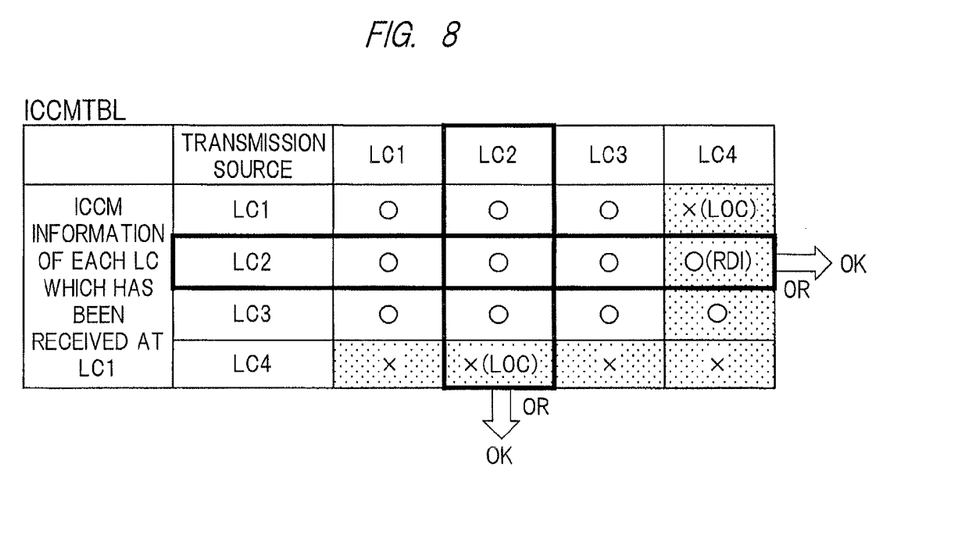
FIG. 8 is an explanatory diagram illustrating an operational example operated when a meter selection unit of FIG. 1 determines a meter unit (a band limiting unit) based on an internal communicability monitoring table of FIG. 7C.

FIG. 8 is an explanatory diagram illustrating an operational example operated when the meter selection unit of FIG. 1 determines the meter unit (the band limiting unit) based on the internal communicability monitoring table of FIG. 7C. If the fault is detected by the internal communicability monitoring unit of its own in the communicability to/from any other line card (the fourth line card LC4 in the example of FIG. 7B) which is the transmission source, the meter selection unit MSEL of the first line card LC1 regards the line card of its own as the fault, and determines the meter unit (the band limiting unit) which is the transmission destination with removing information relating to this line card.

More specifically, as illustrated in FIG. 8, the meter selection unit MSEL of the first line card LC1 removes the monitoring result for the communicability to/from the line card (LC4) as the communication counterpart (that is, the result being information relating to the LC4 of FIG. 8 in the horizontal and vertical directions) from the internal communicability monitoring table ICCMTBL. Then, the MSEL of the LC1 determines the meter unit (the band limiting unit) MT which is the transmission destination of the frame based on the remaining monitoring results. In the example of FIG. 8, as a result of the removal of the information relating to the LC4, the MSEL of the LC1 determines that all communicability to/from the second line card LC2 as the communication counterpart which is the first candidate for the transmission destination is normal, and then, determines a meter unit MT0 of the LC2 as the meter unit of the transmission destination.

In this manner, in addition to the various effects described in the first embodiment, the meter unit which is the transmission destination can be appropriately determined even if, for example, the fault occurs in the line card itself. That is, for example, the case of the fault occurrence in the line card itself can generate such a situation that both of the first and second candidates for the transmission destinations are determined as being abnormal due to the monitoring result for the communicability to/from this line card as the communication counterpart without considering the remaining monitoring results for the communicability. On the other hand, if it has been already found that the fault occurs in a predetermined line card, the meter unit which is the transmission destination can be determined with considering the remaining monitoring result by ignoring the monitoring result relating to the line card, so that a more appropriate determination can be made.

In the foregoing, the invention made by the inventor has been concretely described based on the embodiments. However, the present invention is not limited to the foregoing embodiments, and various modifications and alterations can be made within the scope of the present invention. For example, the above-described embodiments have been explained for easily understanding the present invention, but are not always limited to the ones including all structures explained above. Also, a part of the structure of one embodiment can be replaced with the structure of the other embodiment, and besides, the structure of the other embodiment can be added to the structure of one embodiment. Further, the other structure can be added to/eliminated from/replaced with a part of the structure of each embodiment.

For example, although FIG. 9 illustrates an example in which the same VLAN-use identifier is assigned to the first port group P[1, 1] to P[1, m] and to the second port group P[1, m+1] to P[1, n], the identifiers are not always the same as each other. For example, in the switching device SW, even when it is required to limit the communication band in relay permitted between the VLAN-use identifier assigned to the first port group and the VLAN-use identifier assigned to the second port group or even in other cases, the same effects can be obtained by performing the same operations as those of FIG. 1 or others.

What is claimed is:

1. A network relay device comprising:
a plurality of line cards for relaying a frame, each of which has a port,
each of the plurality of line cards including:
a first processor programmed to limit a communication band of a frame; and
a second processor programmed to monitor communicability to/from each of the other line cards by transmitting and receiving an internal monitoring frame to/from each of the other line cards,
wherein, when a first line card which is any one of the plurality of line cards receives a frame at the port of its own, the first line card refers to monitoring results obtained by the internal communicability monitoring units of the other line cards in addition to a monitoring result obtained by the second processor of its own, determines the first processor which is a transmission destination from the first processors of the other line cards based on the monitoring results, and transmits the received frame to the transmission destination, and
the line card, which has received the frame from the first line card, limits the communication band of the frame by using the first processor of its own, and then, transmits the frame to a predetermined port among the ports of the plurality of line cards.

2. The network relay device according to claim 1,
wherein the first line card is previously set so that the first processors of second and third line cards among the first processors of the other line cards are first and second candidates for the transmission destinations, respectively, and
the first line card transmits the received frame to the first processor of the second line card if all communicability to/from the second line card as a communication counterpart is normal based on the monitoring results, or the first line card transmits the received frame to the first processor of the third line card if any fault is detected in the communicability to/from the second line card as the communication counterpart, and besides, if all communicability to/from the third line card as a communication counterpart is normal.

3. The network relay device according to claim 2,
wherein any one/some of the ports of the plurality of line cards is previously set to a first port group, and the other port(s) is previously set to a second port group, and
the first processor limits a communication band when a frame is relayed between the first port group and the second port group.

4. The network relay device according to claim 2,
wherein, if any fault is detected in communicability to/from a fourth line card as a transmission source which is any one of the plurality of line cards by the second processor of its own, the first line card removes a monitoring result for communicability to/from the fourth line card as a communication counterpart from the monitoring results, and determines the first processor which is the transmission destination of the received frame based on the remaining monitoring results.

* * * * *